Oct. 10, 1961 G. DAVIES 3,003,282
FROST-PROTECTIVE DEVICE FOR GROWING VEGETATION
Filed Dec. 5, 1960 3 Sheets-Sheet 1
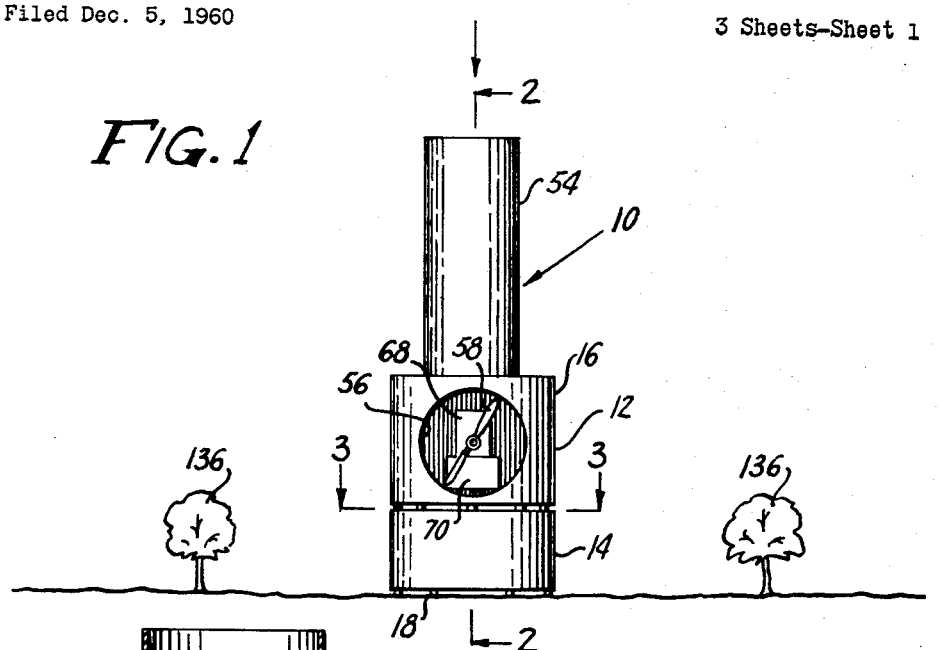
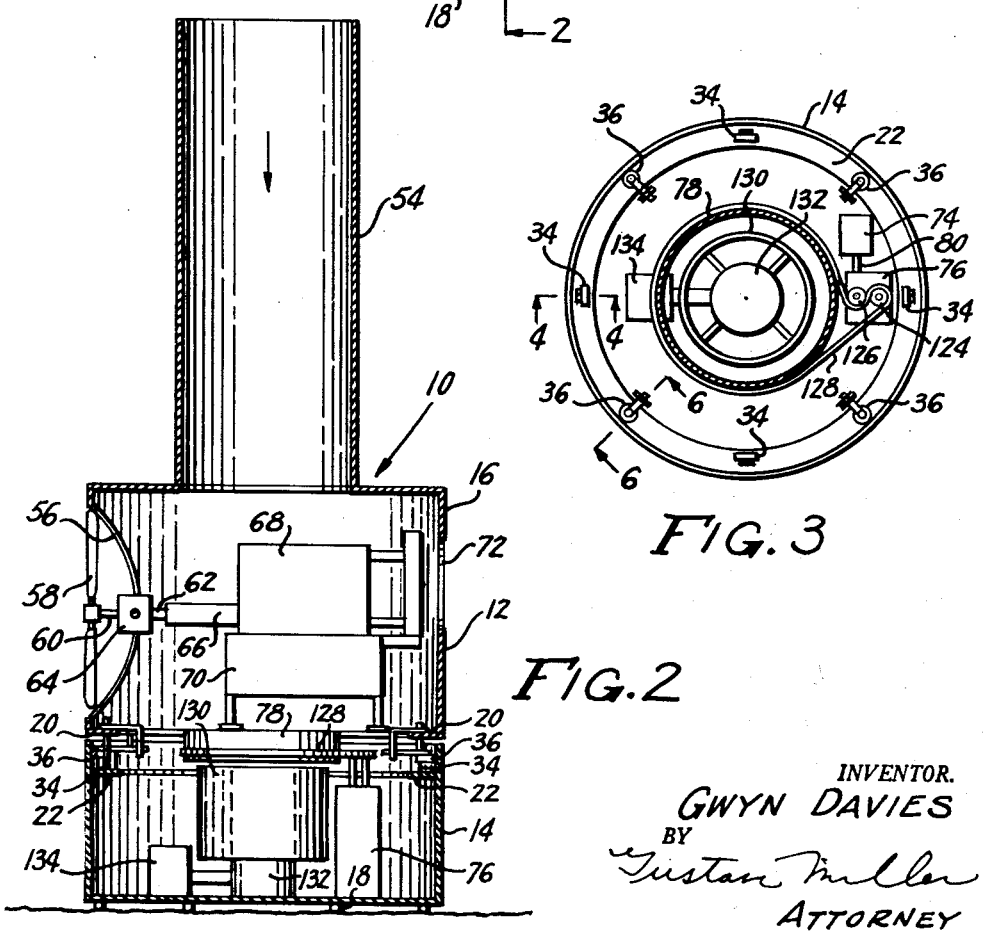
INVENTOR.
GWYN DAVIES
BY
ATTORNEY Oct. 10, 1961    G. DAVIES    3,003,282
FROST-PROTECTIVE DEVICE FOR GROWING VEGETATION
Filed Dec. 5, 1960    3 Sheets-Sheet 2

INVENTOR.
GWYN DAVIES
BY
Gustave Miller
ATTORNEY

INVENTOR.
GWYN DAVIES

United States Patent Office 3,003,282
Patented Oct. 10, 1961

3,003,282
FROST-PROTECTIVE DEVICE FOR GROWING VEGETATION
Gwyn Davies, Scranton, Pa.
(Apt. 10, Hotel Simpson, Mount Dora, Fla.)
Filed Dec. 5, 1960, Ser. No. 73,630
8 Claims. (Cl. 47—2)

This invention relates to a device for protecting plant growth such as trees and other vegetation from frost, and it particularly relates to a device of the aforesaid type utilized to prevent crop injury by an inversion-type frost.

For many years, the citrus and truck-garden farmers of such states as Florida and California have suffered tremendous losses from winter or early spring frosts. Attempts were made to combat such frosts with smudge-pots and oil heaters. However, in addition to the expense involved and the danger of fires, the results attained by these methods were most unsatisfactory because the heat generated tended to immediately rise straight up into the atmosphere instead of spreading laterally to the surrounding areas.

In order to overcome the disadvantages inherent in the use of smudge-pots and heaters, a certain type of machine called a "wind-machine" was developed. These wind machines generally consist of a motor-driven propeller atop a steel column and are used to take advantage of the so-called "inversion" or "invection" layer, constituting a layer of warmer air overlying the colder air at ground level, which often exists. The inversion layer usually lies about 26 to 30 feet or more above the ground and has a temperature which is generally about 2 to 7 degrees higher than the temperature at ground level.

The wind machines extend up to about the level of the inversion layer and are used to exert a mixing force to intermix the warmer air of the inversion layer with the colder air below, thereby substantially increasing the temperature of the air surrounding the trees and other vegetation on the ground.

However, these wind machines could only be used on calm windless occasions because if the wind attains a force of only about 5–6 m.p.h., the inversion layer is destroyed. Furthermore, even where there is substantially no wind, there is a gradual decline in temperature from the inversion layer to the ground so that, with the wind machines operating even in ideal weather, a good portion of the inversion layer is destroyed on the way down through the colder strata.

Since the wind machines described above did not solve the problem, some attempts were made to draw the inversion layer air down through ducts which could be rotated to impel this warmer air laterally in all directions at ground level or thereabouts. However, these machines were not sufficiently strong to be able to draw down enough air to permit adequate warming of the lower area. At the same time, they were overly complex in structure and difficult to keep in good maintenance.

It is one object of the present invention to overcome many of the aforementioned difficulties by providing a protective device which draws down the inversion layer air intact and without admixture with the colder air at lower levels and which then not only retains the full thermal capacity of this inversion air but also increases it and distributes it laterally to a relatively large area and with relatively great thermal effectiveness.

Another object of the present invention is to provide a protective device of the aforesaid type which although provided with a completely rotatable air distribution is provided with a stationary portion serving as a housing for efficient heating equipment.

Another object of the present invention is to provide a protective device of the aforesaid type wherein the device can be vertically adjusted in accordance with the height of the trees or other vegetation in the area.

Another object of the present invention is to provide a protective device of the aforesaid type wherein the air distribution means can be stopped in its rotation and directed in full against cold air coming from any direction.

Other objects of the present invention are to provide an improved protective device, of the character described, that is easily and economically produced, which is sturdy in construction, and which is highly efficient in operation.

With the above and related objects in view, this invention consists in the details of construction and combination of parts, as will be more fully understood from the following description when read in conjunction with the accompanying drawings, in which:

FIG. 1 is a side elevational view of a device embodying the present invention.

FIG. 2 is a sectional view taken on line 2—2 of FIG. 1.

FIG. 3 is a cross-sectional view taken on line 3—3 of FIG. 1.

Figure 4:
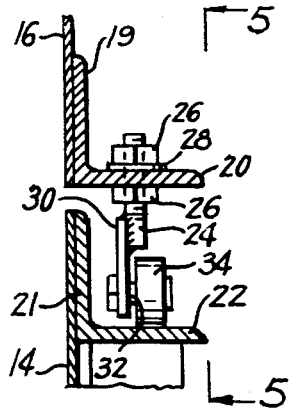
FIG. 4 is a sectional view taken on line 4—4 of FIG. 3.
Figure 5:
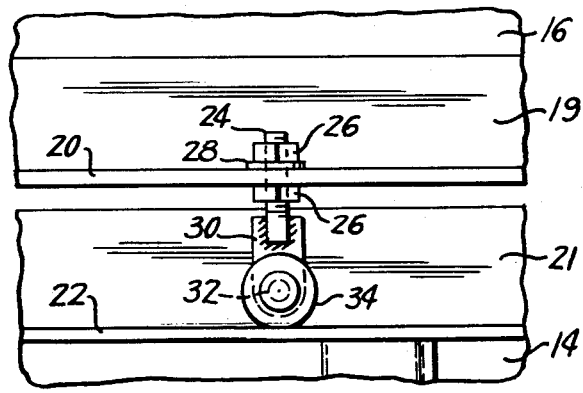
FIG. 5 is a fragmentary elevational view taken on line 5—5 of FIG. 4.

Referring in greater detail to the drawings wherein similar reference characters refer to similar parts, there is shown a protective device, generally designated 10, comprising a two-part cylindrical housing 12 which includes a lower stationary housing section 14 and an upper rotatable housing section 16.

The lower section 14 is mounted on a plurality of feet 18 which serve to support the entire device. If desired, the feet 18 may be formed of a plurality of telescoping parts to provide adjustability. Alternatively, concrete or other blocks or shims may be used under the feet 18 to raise the device to a desired height.

Figure 6:
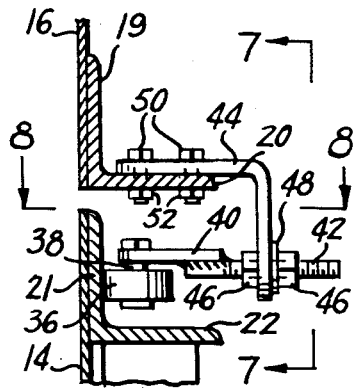
FIG. 6 is a sectional view taken on line 6—6 of FIG. 3.
Figure 7:
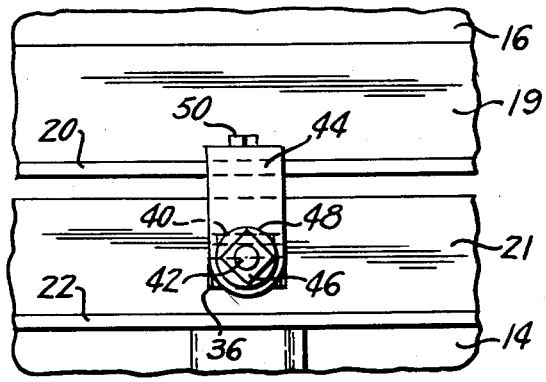
FIG. 7 is a fragmentary elevational view taken on line 7—7 of FIG. 6.
Figure 8:
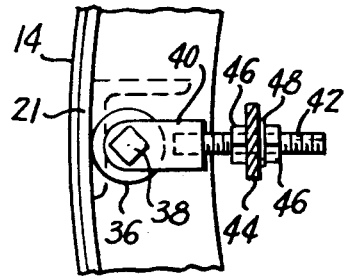
FIG. 8 is a fragmentary sectional view taken on line 8—8 of FIG. 6.
Figure 9:
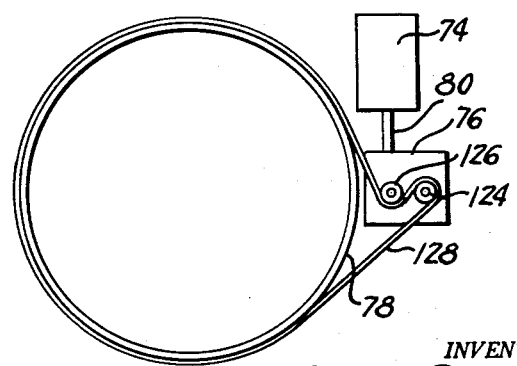
FIG. 9 is an enlarged view similar to FIG. 3 but with parts omitted.

The upper rotatable section 16 is provided with an inner ring on its bottom periphery. This ring, designated 19, is L-shaped in cross-section (as best shown in FIGS. 4 and 6) and its horizontal portion 20 forms an inwardly extending lateral or radial flange. The lower section 14 is similarly provided with a ring 21 of similar L-shaped cross-section, this ring 21 being spaced just below the top of the section 14 coaxial with the ring 19. The ring 21 is also provided with a horizontal portion 22 forming an inwardly extending radial flange while the vertical portion of the ring 21 forms an annular bearing strip.

The flange 20 is provided with a series of bolts or threaded rods 24 extending vertically through corresponding tapped holes in the flange 20 and held in adjusted position by oppositely disposed nuts 26 and washers 28. Each bolt or rod 24 is connected to a vertical plate 30 apertured to receive a horizontal bolt or pin 32 serving as an axle for a roller 34.

The rollers 34 serve as rotatable supports or thrust bearings for the rotatable upper section 16 while horizontal thrust bearings are provided by rollers 36, each of which is rotatably mounted on a pin or bolt 38 depending from a horizontal plate 40 fixed to a bolt or threaded rod 42 extending through a tapped hole in the vertical portion of an L-shaped bracket 44. Nuts 46 and washers 48 hold the rods 42 in place on the vertical portions of their corresponding L-shaped brackets 44 while the horizontal portions of these brackets 44 are connected to the flange 20 by bolts 50 and nuts 52. As many rollers 34 and 36 as desired may be used, although only four of each are illustrated. Sixteen of each provides a very stable support.

The upper section 16 of the housing 12 is provided with a vertical duct or stack 54 extending from the top of the section 16 and opening into its interior. At one side, the section 16 is provided with a circular opening 56 and in this opening 56 is positioned a blower fan 58. The fan 58 is mounted on a rod 60 which is releasably coupled to a motor shaft 62 by means of a coupling means 64. The motor shaft 62 extends through a sleeve 66 and into the motor housing 68 where it is operatively connected to an electric or gasoline motor. The motor housing 68 is mounted on a block 70 within the section 16. An opening 72 is provided in the section 16 in opposed relation to the fan 58 and opening 56.

Figure 10:
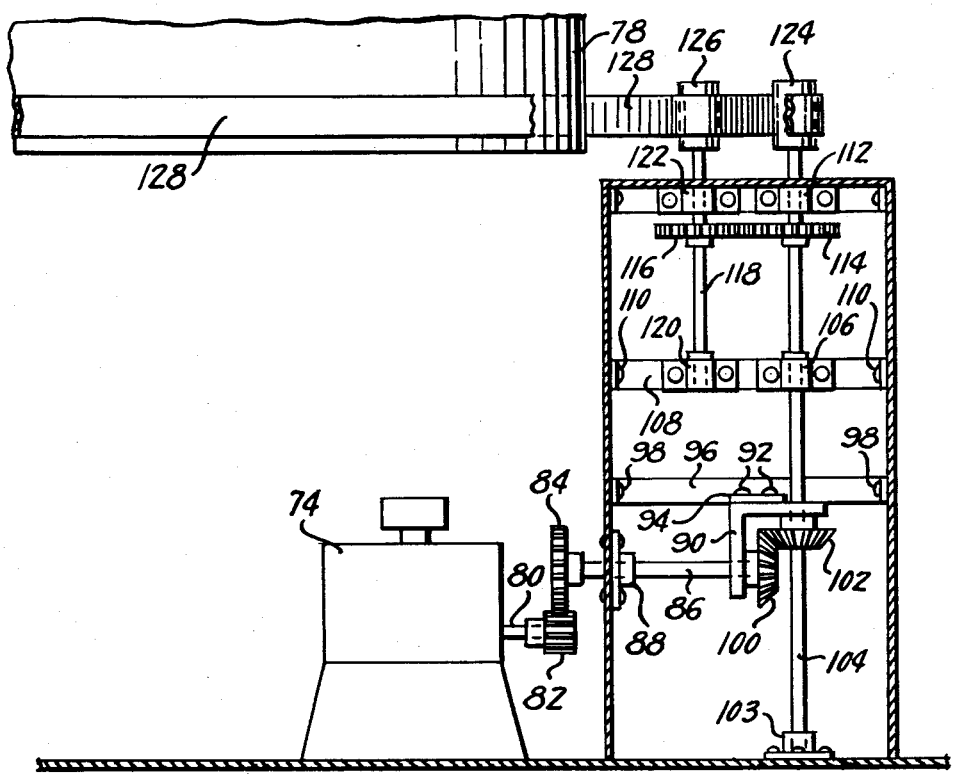
FIG. 10 is an enlarged sectional view of the gear box and elevational view of the motor for rotating the upper portion of the housing.

In the lower housing section 14 is provided an electric or gasoline engine or motor 74 which is drivingly connected through a gear system in a gear box 76 with a hollow cylindrical extension 78 depending from the center of the housing section 16. This driving connection is provided by means of a motor shaft 80 having a gear 82 (as best seen in FIG. 10) which meshes with a reduction gear 84 on a shaft 86 extending from the gear box 76 through a bearing 88. The shaft 86, within the box 76, extends through an apertured angle bar or bracket 90 which is connected by rivets 92 to a plate 94 mounted on a bar 96 which is, itself, riveted at either end, as at 98, to the walls of the gear box 76.

The end of shaft 86 within box 76 is provided with a bevel gear 100 meshing with a bevel gear 102 on a vertical shaft 104 journaled in a base bearing 103. The shaft 104 extends through a bearing 106 on a cross bar 108 riveted at 110 to the walls of box 76. It also extends through the top of box 76 after passing through a bearing 112.

A spur gear 114 is provided on shaft 104 within box 76 and this gear 114 meshes with a spur gear 116 on a second vertical shaft 118 journaled at 120 on the cross bar 108. The shaft 118 extends through the top of gear box 76 after passing through a bearing 122.

The upper end of the shaft 104 is provided with a roller 124 and the upper end of shaft 118 is provided with a roller 126 and around these rollers 124 and 126 is sinuously positioned an endless drive belt 128. The sinuous passage of belt 128 around rollers 124 and 126 (as illustrated in FIG. 3) prevents any slippage of the belt 128 and permits it to positively drive the cylindrical extension 78 which it encompasses.

Also within the lower housing 14 is a heater 130 coaxial with the cylindrical extension 78. The heater 130 may be any type desired, but is illustrated as an oil heater with a burner 132 and a fuel supply 134.

In operation, the device 10 is installed in the midst of an area of trees 136 or other foliage to be protected, and the stack 54 is sufficiently high to extend into the inversion layer while the openings 58 and 72 and the fan 58 are about at tree-top level. The heater 130 is then turned on and the motors or engines 68 and 74 are actuated. The motor or engine 74 acts through the gearing system in the gear box 76 to drive the rollers 124 and 126 which drive the belt 128 to rotate the upper section 16 from which the cylindrical extension 78 depends. The speed of rotation can be varied by using a variable speed motor or by using variable sets of gears (not shown) operated by a clutch means of standard design (not shown).

As the fan 58 rotates, it provides a suction in the stack 54. This suction pulls air down through the stack 54 from the inversion layer, this air being completely taken from the inversion layer and being unmixed with the colder air at lower levels.

The relatively warm inversion layer air which is sucked down into the housing 12, is mixed with even warmer air which has been sucked in through opening 72 and warmed by the heater 130. This warm air mixture is then blown out through the opening 56 by the fan 58 which, in this manner, acts both as a suction fan and as a blower. This warm air mixture is evenly distributed in the area by the rotation of the housing section 16 at a level just above the tops of the trees 136, which as here illustrated are very young trees in a citrus orchard.

By means of the construction of the device described above, not only is the relatively warm inversion air completely utilized without mixture with the lower colder air, but because of the stationary nature of the lower housing section 14, an efficient heater can be used for mixing the inversion layer air with pre-heated air, thereby obtaining the benefits of both inversion layer tapping and pre-heating. In addition, the device can be used even when relatively strong winds are prevalent, because the winds cannot act to intermix the inversion layer air with the colder lower level air, since the inversion layer air is protected by the stack 54.

The draft of warm air from the fan 58 expands as it spreads over the trees 136 to encompass the nearest trees 136 as well as more distant trees, up to a distance of two hundred and fifty feet, more or less. When the trees have grown to such a height that the nearest trees would block off the warm air to the farther trees, the entire protection device 10 is raised, by legs or otherwise, to a suitable height to maintain heating efficiency and continue to protect the trees whenever killing frosts may be present.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A plant growth protective device comprising a generally cylindrical housing which includes a lower stationary housing section and an upper rotatable housing section, said upper section having an open-ended stack extending from its upper end, said upper end being closed except for an opening mating with said stack, an inlet opening and an air outlet opening provided in the wall area of said upper section, a blower unit in said upper section, said blower unit including a fan positioned for rotation in said outlet opening, a heater in said lower housing section, said heater being in communication with the interior of said upper section, and drive means in said lower section operatively connected to said upper section to rotate said upper section relative to said lower section.

2. The device of claim 1, said drive means being a motor in said lower section, said motor being operatively connected to a pair of rollers for rotating said rollers, an endless drive belt extending sinuously around said rollers, a cylindrical extension on said upper section, and said drive belt encompassing said extension.

3. The device of claim 1, and said fan being releasably coupled to a motor shaft, said motor shaft extending from a motor within said upper section.

4. A plant growth protective device comprising a housing of generally cylindrical shape, said housing including an upper rotatable section and a lower stationary section, an open-ended stack extending upward from the top of said upper section, a blower unit in said upper section, an inlet in said upper section, an air outlet in said upper section, a heater in said lower section, drive means in said lower section operatively connected to said upper section to rotate said upper section, an inner peripheral flange at the bottom of said upper section, a coaxial inner peripheral flange adjacent the top of said lower section, an annular bearing strip on the inner surface of said lower section above the flange therein, roller means connected to the flange in the upper section and rotatably bearing against the flange in the lower section, and roller means connected to the flange in the upper section and rotatably bearing against said annular bearing strip.

5. The device of claim 4, said roller means connected to said flange in the upper section being adjustable relative to its respective flange or bearing strip.

6. The device of claim 4, said drive means comprising a motor having a motor shaft with a gear thereon, said gear being in mesh with a second gear on a second shaft extending into a gear box in said lower housing section, said second shaft being provided with a bevel gear within said gear box, said bevel gear being in mesh with a bevel gear on a vertical main shaft in said gear box, said main shaft having a spur gear in mesh with a spur gear on a secondary vertical shaft in said gear box, both of said vertical shafts extending out of said gear box and being provided with individual rollers outside said gear box, an endless drive belt sinuously encompassing said rollers on said vertical shafts, a cylindrical extension depending from said upper section, and said drive belt drivingly encompassing said cylindrical extension.

7. The device of claim 4, and supporting feet on the bottom of said lower section, said feet being selectively adjustable.

8. The device of claim 4, said blower unit comprising a motor, a motor shaft extending from said motor, a coupling means on said motor shaft, and a fan removably connected to said coupling means, said fan being positioned in said air outlet.

References Cited in the file of this patent

UNITED STATES PATENTS

| | | |
|---|---|---|
| 2,712,714 | McGee | July 12, 1955 |
| 2,807,120 | Graham | Sept. 24, 1957 |